(12) United States Patent
Brunella

(10) Patent No.: US 6,331,020 B1
(45) Date of Patent: Dec. 18, 2001

(54) COUPLING FOR FLEX PIPE, RIGID PIPE AND FLEXIBLE HOSE

(75) Inventor: Alfred J. Brunella, Long Beach, CA (US)

(73) Assignee: Pacific Flo-Rite, Inc., City of Industry, CA (US)

( * ) Notice: Subject to any disclaimer, the term of this patent is extended or adjusted under 35 U.S.C. 154(b) by 0 days.

(21) Appl. No.: 09/640,756

(22) Filed: Aug. 18, 2000

Related U.S. Application Data

(60) Provisional application No. 60/149,908, filed on Aug. 23, 1999.

(51) Int. Cl.[7] ................................................... F16L 27/00
(52) U.S. Cl. .......................... 285/179; 285/414; 285/415; 285/305; 285/321
(58) Field of Search .................................. 285/414, 415, 285/305, 321, 179

(56) References Cited

U.S. PATENT DOCUMENTS

| | | |
|---|---|---|
| 442,947 | 12/1890 | Bowers . |
| 924,039 | 6/1909 | Clark . |
| 1,609,159 | 11/1926 | Dawson . |
| 1,774,179 | 8/1930 | MacGregor . |
| 1,903,926 | 4/1933 | LaMont . |
| 2,360,427 | 10/1944 | Lapp . |
| 2,590,392 * | 3/1952 | Feilden . |
| 3,575,675 * | 4/1971 | Hirsch ................................ 285/414 |
| 3,604,733 * | 9/1971 | Hubbell, III ....................... 285/414 |
| 3,761,114 * | 9/1973 | Blakeley ............................ 285/415 |
| 3,900,221 * | 8/1975 | Fouts .................................. 285/179 |
| 3,920,270 * | 11/1975 | Babb, Jr. ............................ 285/321 |
| 3,966,234 * | 6/1976 | Sundholm ........................... 285/415 |
| 4,023,833 | 5/1977 | Wellard . |
| 4,058,330 | 11/1977 | Wolf . |
| 4,120,175 | 10/1978 | Dernedde . |
| 4,220,360 | 9/1980 | Jacek et al. . |
| 4,229,025 | 10/1980 | Volgstadt et al. . |
| 4,236,733 | 12/1980 | Zambrano . |
| 4,252,346 | 2/1981 | Sundholm . |
| 4,265,472 | 5/1981 | Ipsen . |
| 4,282,175 | 8/1981 | Volgstadt et al. . |
| 4,407,526 | 10/1983 | Cicenas . |
| 4,487,438 | 12/1984 | Sweeney . |
| 4,602,654 | 7/1986 | Stehling et al. . |
| 4,628,965 | 12/1986 | Passerell . |
| 4,712,813 | 12/1987 | Passerell et al. . |
| 4,804,206 * | 2/1989 | Wood et al. ........................ 285/321 |
| 4,960,296 | 10/1990 | Thelen et al. . |
| 5,063,968 | 11/1991 | Bartholomew . |
| 5,288,111 | 2/1994 | Storf et al. . |
| 5,314,215 * | 5/1994 | Weinhold ........................... 285/415 |
| 5,563,374 | 10/1996 | Hubert . |
| 5,718,461 | 2/1998 | Esser . |
| 5,758,909 * | 6/1998 | Dole et al. . |
| 5,845,386 | 12/1998 | Watts . |
| 5,893,589 | 4/1999 | Bleitz et al. . |

FOREIGN PATENT DOCUMENTS

| | | | |
|---|---|---|---|
| 2106010 * | 9/1971 | (DE) ................................... | 285/414 |
| 26 00 011 | 7/1976 | (DE) . | |
| 2363753 * | 3/1978 | (FR) ................................... | 285/179 |

* cited by examiner

*Primary Examiner*—Eric K. Nicholson
(74) *Attorney, Agent, or Firm*—James Creighton Wray; Meera P. Narasimhan

(57) ABSTRACT

The invention provides a one-piece flex pipe connection that has a bend, and any angle to a termination of a thread, groove or a 360° swivel flange. Additionally the invention provides a flex pipe coupling with a bend and with one end having a groove clamp connection and the other having a thread, groove or the 360° flange swivel. The last piece is a 360° bend swivel to a thread, groove or a 360° flange swivel. A preferred flex pipe coupling apparatus has a connector body with angularly related ends and with a central portion between the ends. At least one of the ends has a cylindrical recess. A shoulder at an axial end of the recess near the central portion cooperates with an end of a flex pipe inserted in the recess. An annular seal receiver in the cylindrical recess near the shoulder holds a resilient seal for sealing the end of the flex pipe. An annular groove in the recess cooperates with an annular groove in the flex pipe to receive and hold connecting elements for connecting the flex pipe to the connector.

19 Claims, 3 Drawing Sheets

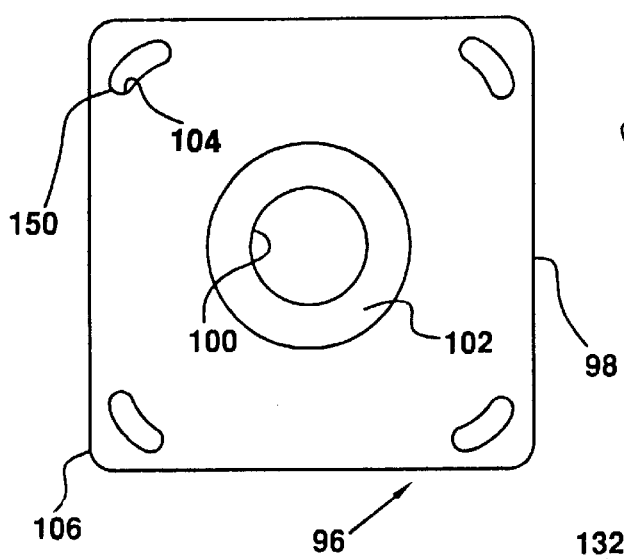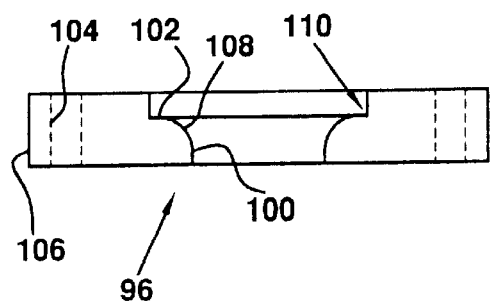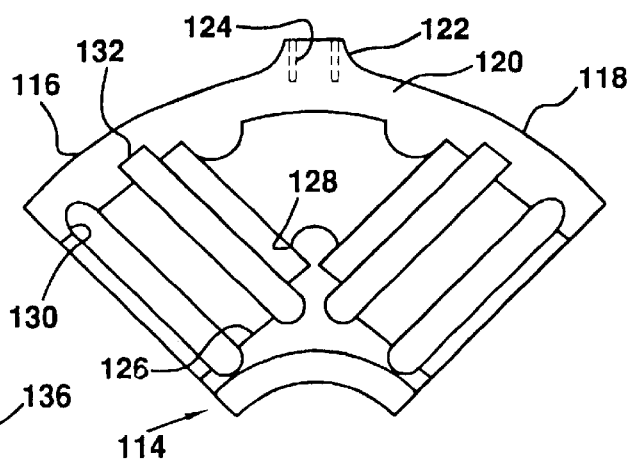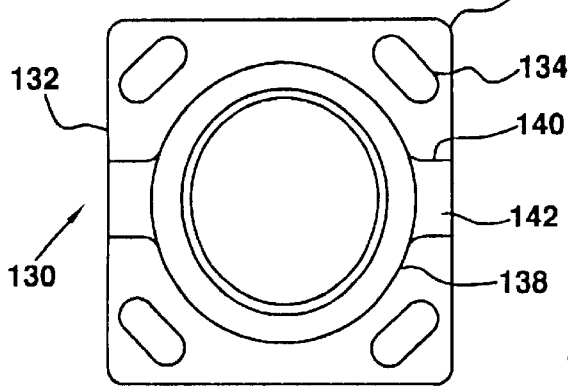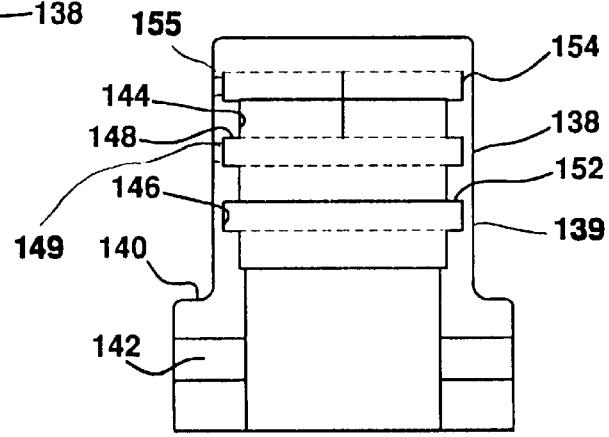

COUPLING FOR FLEX PIPE, RIGID PIPE AND FLEXIBLE HOSE

This application claims the benefit of U.S. Provisional Application No. 60/149,908, filed Aug. 23, 1999.

BACKGROUND OF THE INVENTION

Apparatus plumbing is accomplished by using rigid or flex pipe. When using a rigid pipe, all connections are welded and either are threaded together or each end of the pipe is grooved and clamped together with a two-bolt clamp. Termination is normally into a flanged face valve that controls the direction of the flow. Again at this point threads or the groove-type connection is made to the flange. If the plumbing line requires a bend, it is accomplished by welding several pieces together to obtain the 45 or 90 bend necessary to reach termination point.

Flex pipe couplings are either threads or the grooved style. Again, if 45 or 90 are necessary an adapter is used, and again is attached by welding. The flow rate is a major concern. The flex pipe couplings are attached in such a manner that there is no flow restriction and no pressure drop.

Sometimes it takes 4 to 6 welds in a 3 to 5 foot line to achieve proper termination. All welds have to be X-rayed and require expensive weld preparation.

This invention eliminates all the welding when terminating into a flange, and all the threaded couplings, all the grooved couplings and all the bolt clamps.

Needs exist for improved plumbing apparatus for pump and fire trucks.

SUMMARY OF THE INVENTION

This invention applies to the apparatus plumbing of pump trucks and fire trucks, and applies to any pump apparatus.

With the use of flex pipe and without sacrificing any flow, restriction or pressure drop, the invention provides a no weld flange-to-flange, a no weld thread-to-flange, or a groove-to-flange connection. The end can terminate in a 90° or 45° bend without welding. The flange that terminates into the valve has a female socket. The 90° and 45° plugs into flange socket allowing the plumon to clock the 90° and 45° to any positions.

The invention provides a one-piece flex pipe connection that uses a standard Vitraulic type groove that can terminate into a 90°-45° flange or any no weld female socket.

The present invention includes a rigid elbow coupling for the flexible piping of apparatus plumbing on pump trucks and fire trucks. The elbow may consist of either a 45° or 90° or any bend. The coupling end which connects to the flexible piping is a standard Vitraulic style end. The other coupling end which connects to the valve has a no weld socket. Thus, the 45°-90° or any bend can rotate 360°, which allows for easy installation. The invention provides a seamless flange-to-flange connection while eliminating all the welding, threaded couplings and bolt clamps required by the conventional method of creating bends in the plumbing line of apparatus plumbing on pump trucks and fire trucks.

The flange is generally rectangular, and the bolt-receiving holes comprise four equally spaced arcuate-shaped through-hole openings near corners of the rectangular flange.

A flexible hose coupling is a standard Vitraulic groove type. The enlarged end of the coupling has a cylindrical recess for receiving the end of the elbow, and an annular groove in the recess for aligning with the annular groove in the elbow exterior wall. A shoulder at the end of the interior recess receives the end of the elbow. An annular seal is disposed between an interior wall of the recess and the end of the elbow within the recess, and a connector is disposed in the annular grooves.

The connector comprises toroidal elements positioned in the grooves, and an access opening extending between the groove in the recess of the coupling and an outer wall of the coupling for inserting connectors in the grooves.

A preferred flex pipe coupling apparatus has a connector body with angularly related ends and with a central portion between the ends. At least one of the ends has a cylindrical recess. A shoulder at an axial end of the recess near the central portion cooperates with an end of a flex pipe inserted in the recess. An annular seal receiver in the cylindrical recess near the shoulder holds a resilient seal for sealing the end of the flex pipe. An annular groove in the recess cooperates with an annular groove in the flex pipe to receive and hold connecting elements for connecting the flex pipe to the connector.

One coupling has a second cylindrical recess in the second end of the pipe. A second shoulder at an axial end of the second recess near the central portion cooperates with an end of a second flex pipe. A second annular seal receiver in the second cylindrical recess near the second shoulder holds a second resilient seal for sealing the end of the second flex pipe. A second annular groove in the second recess cooperates with an annular groove in an exterior wall of the second flex pipe to receive and hold connecting elements for connecting the second flex pipe to the second cylindrical recess in the connector.

The first end of the connector is generally cylindrical. n A generally rectangular flange is integrally formed at the second end of the connector. The flange has arcuate bolt-receiving through-holes near corners of the rectangular flange for mounting the flange.

Opposite bosses extend from the flange along the cylindrical section, and threaded openings extend radially through the bosses and the cylindrical sections.

A second cylindrical end is angularly related to the first cylindrical end, and the second cylindrical end has a groove in its outer wall.

The second end extends at about 135° to the first end.

The first end has three annular grooves extending into the recess.

The first cylindrical- end section and the second cylindrical end section are oriented at 90°. A central, partially cylindrical section joins the first and second end sections.

The second end section has a necked down section and a terminal portion with external threads. The second end section has a cylindrical outer wall with an annular groove in the cylindrical outer wall. Alternatively, the first and second ends are substantially similar.

These and further and other objects and features of the invention are apparent in the disclosure, which includes the above and ongoing written specification, with the claims and the drawings.

BRIEF DESCRIPTION OF THE DRAWINGS

FIG. 7 is a plain view of a preferred flange.

FIG. 8 is a sectional view of the flange shown in FIG. 7.

FIG. 9 is sectional view of a connector.

FIG. 10 shows a plan view of a flange connector.

FIG. 11 shows a cross-sectional elevation of the flange connector shown FIG. 10.

DETAILED DESCRIPTION OF THE PREFERRED EMBODIMENTS

Figure 1:
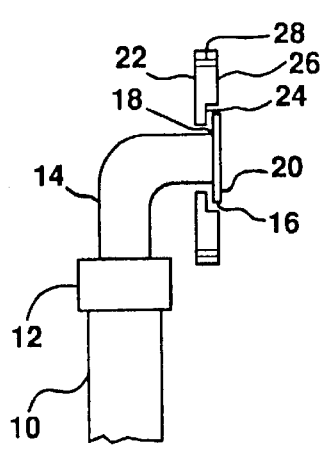
FIG. 1 shows a new one-piece bend with a turnback and flange pump connection, and a flexible pipe coupling at the outer end.

FIG. 1 shows a flexible pipe 10 with a flexible pipe coupling 12 connected to a one-piece bend 14, which may be, for example, 90° or 45°. A turnback 16 is rolled and upset at end 18 create a sealing face 20 for abutting the face seal in the pump outlet flange. An aluminum or any non-corrosive metal four-bolt flange has a recess 24 for receiving the turnback 16. A face 26 abuts the face of the pump outlet flange. Bolts extend through openings 28 to bolt the flange 22 to the pump outlet.

Figure 2:
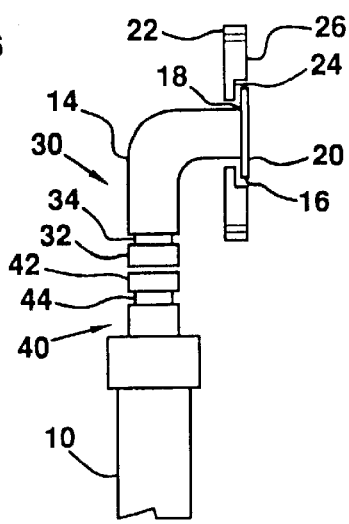
FIG. 2 shows a second new one-piece connector with a standard groove and clamp end.

FIG. 2 shows a flexible pipe end connector 30 with a standard Vitraulic-style end 32. A groove 34 receives a projection on a clamp for positive interlocking with the flexible pipe 10. The flexible pipe coupling 40 has a standard Vitraulic-style end 42 with a groove that receives projections for a positive interlock with the clamp. Gaskets provide a watertight seal.

Figure 3:
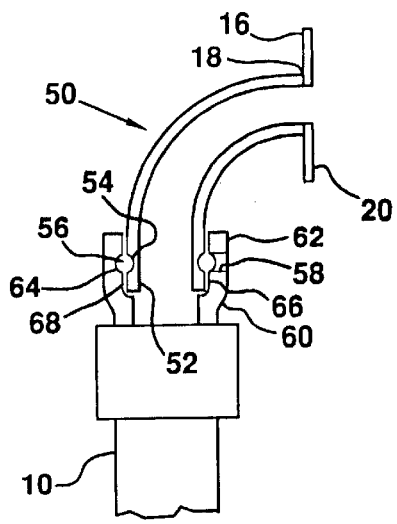
FIG. 3 shows a new bent end flexible pip connector.

FIG. 3 shows a swivel-connecting bent end 50 for a flexible pipe 10. The second end 52 has a groove 54 in its outer surface for acting as a race and receiving balls 56. The balls are inserted through hole 58 in the outer end 62 of coupling 60. Groove 64 forms the outer race way of the ball bearing swivel connection. An 0-ring 66 fits in a groove 68 in the inside of connector 60 for forming a watertight seal with the outer surface of end 52.

Figure 4:
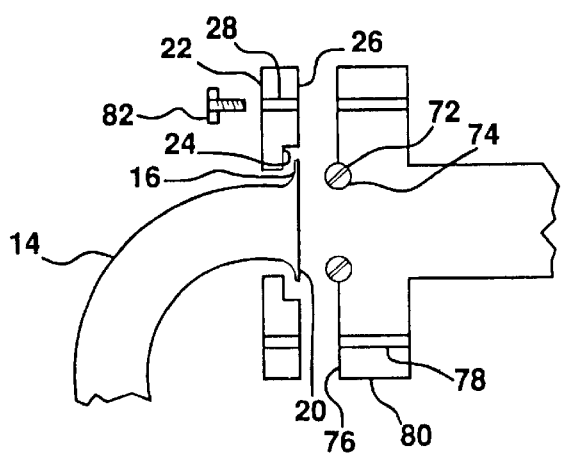
FIG. 4 shows and new one-piece bent end for a flexible pipe connector in relation to a pump outlet flange.

As shown in FIG. 4, the face 20 of turnback 16 abuts the O-ring 72 held in groove 74 of face 76 of the pump outlet flange 80. Openings 78 extend through pump outlet flange 80 to receive bolts 82. Preferably the holes 78 are threaded to receive and hold the bolts. Alternatively, nuts may be provided. The flange 80 may be radially shortened and provided with male threads to receive female threads on flange 22 for use in place of the bolts 82. In that event the outer portion of flange 22 would be axially extended. Alternatively, male threads could be provided on flange 22 and complementary female threads could be provided on flange 80.

The flange 22 is slipped over the connector 14 before the turnback is upset or attached. Preferably the flange 22 may be slid into place via the opposite end of the connector.

The flange 22 allows complete 360° angular connection to the pump outlet flange. The flexible pipe connected to connector 14, 30 or 50 may be clocked or turned to any degree before tightening the bolts 82 or the threaded connection between flange 22 and the flange 80. The seamless connection is free of flow impedance and avoids pressure drop loss.

The interior of bend 14 is smoothly aligned with the interior 84 of the pump outlet. The one-piece coupling aluminum or any non-corrosive metal flange can be any type of termination needed, threads, interrupted quick coupling threads, a Vitraulic groove, a weld preparation, etc.

The 45°-90° can be a 360° swivel so that both the coupling and flange will swivel.

Through the use of a standard Vitraulic adaptor, a plumber can "clock" or turn the assembly in infinite increments through 360° to fit all needs.

Figure 5:
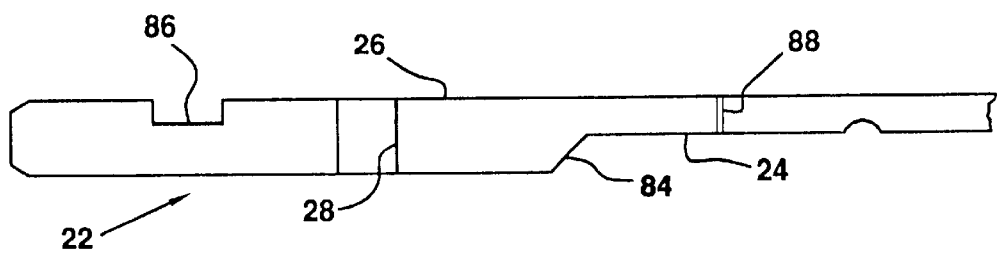
FIG. 5 is a half-section showing a preferred construction of the flange body.

As shown in the quarter-section of FIG. 5, the flange 22 has bolt openings 28 and a recess 24 to receive the turnback. The end 84 of the recess is sloped at 45°. An annular groove 86 in the face 26 receives a face seal, for example an O-ring. The central opening 88 receives the one-piece bend.

Figure 6:
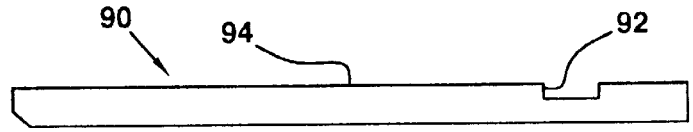
FIG. 6 is a partial cross-section showing a preferred construction of the male pipe end swivel.

The male swivel quarter-section shown in FIG. 6 shows the wall 90 of a pipe with a recess 92 for receiving connecting elements. The center portion 94 of the wall is knurled to assist turning.

FIGS. 7 and 8 show a floating flange 6 that has a rectangular shape 98. A central opening 100 receives a coupling body and recess 102 which receives the turnback. Four equal arcuate openings 104 are located near corners 106 of the floating flange. A radiused toroidal surface 108 connects the recess 102 and the cylindrical surface of the central opening 100. The corner 110 between the recess base 102 and the side wall 112 of the recess is sharp.

The Grooved Couplings are not eliminated. The Grooved Male Couplings are standard Vitraulic type grooves and are used world-wide. We use this standard groove on the male coupling. The new No weld Coupling can be used anywhere a Vitraulic type grooved coupling is used. The couplings shown, we only use FIGS. 9 thru 15. We use standard Vitraulic male grooves on the flexpipe. All flanges have a No Weld jacket that can accept the male grooved end of a 90°-45° on any bend. The socket is slotted with an opening into the retaining area. A standard cable is pushed around the race, preventing the male from separating from the female. The "O " Ring Seal is in front of the retaining lanyard.

90° connector 114 is shown in FIG. 9. The connector has identical end sections 116 and 118, and a partially cylindrical or spherical center section 120. The center section 120 has a boss 122 and a threaded opening 124 for receiving an attachment. Each end section has a recess 126 with a shoulder 128 for receiving the end of a flex pipe. A groove 130 near the end of the connector receives connecting elements which cooperate with a similar groove in a swivel or rigid fled pipe end. An annular groove 132 near each shoulder 128 receives a shaped annular seal for sealing the connection.

A flanged connector is shown in FIGS. 10 and 11. FIG. 10 is a front view of FIG. 11. The flanged connector 134 has a flange base 133. Arcuate bolt-receiving openings 134 are positioned near corners 136 for receiving mounting bolts. The connector flange has a cylindrical portion 138 with a cylindrical outer surface 139, which extends outward from the flange. Bosses 140 have threaded openings 142 for attachments. Each cylindrical portion 138 has a recess 144 with inner axially extending surfaces ended by a radially extending shoulders 146 which receives an inner end of the male flex pipe. The recess 144 has three grooves, 148, 152 and 154. The annular groove 148 cooperates with a similar complimentary annular groove on an external surface of a male flex pipe swivel end to receive an interconnecting element such as a cable having a diameter larger than the depth of groove 148. The cable is inserted through slot 149, which extends from groove 148 to the outer surface 139 of the cylindrical end 138. Groove 152 receives a resilient "O" Ring seal, which compresses in groove 152 and against the cylindrical wall of the male flex pipe. Groove 154 receives an auxiliary cable inserted through slot 155 which cable fits within groove 154 and a complimentary second groove on the male pipe. Slots 149 and 155 are radial or tangential or at intermediate angles grooves 148 and 154.

The slot 149 is cut through the coupling wall thickness to groove 148. A cable lanyard is shoved through the slot and around the aligned grooves until cable is back at the start position. The slot is then plugged in a permanent connection. In a temporary connection, the lanyard extends from the slot for pulling it out before uncoupling the pipe. The lanyard may hold in place by a wedge.

In a preferred embodiment, the slot 149 is cut straight through the wall in a tangential direction so that it partially opens the slot 149. A preferred lanyard cable has a loop formed at on end. The straight end is pushed into one end of he slot and through the aligned complimentary grooves. The cable passes about 340° or more around the coupling through the grooves, and the free end emerges from the other end of the slot. The free end is then passed through the loop and locked or sealed to itself or to the other end of the cable. Alternatively opposite ends of the cable are crimped or sealed together with a lead-type seal. Behind the walls of the fire truck when the couplings are used in permanent or semipermanent plumbing, the ends may be left free. When used in water spraying or sprinkling systems, the ends may be locked or sealed to deter tampering.

Figure 12:
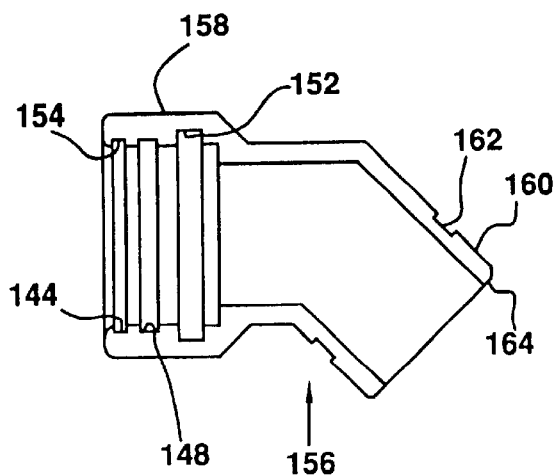
FIG. 12 is cross-sectional elevation of a connector.

FIG. 12 shows a 135° connector 156, which has cylindrical end portions 158 and 160. Cylindrical end portion 158 has an internal recess 144 and grooves 148, 152 and 154, which are similar in construction to the recess shoulder and grooves shown in FIG. 11. Groove 148 receives coupling elements which fit within complementary grooves in a swivel end, and grooves 152 and 154 receive resilient seals. Cylindrical end 160 is constructed as a swivel end, and has an annular exterior groove 162 for receiving coupling elements and cooperating with grooves such as 148 and recesses such as 144. Two connectors, such as shown in FIG. 12, may be interconnected by sliding cylindrical portion 160 within the recess 144 and cylindrical portion 158 of a second connector 156 to provide a substantially universal connection. The end 164 of one connector may be positioned near the shoulder 146 of a second connector.

Figure 13:
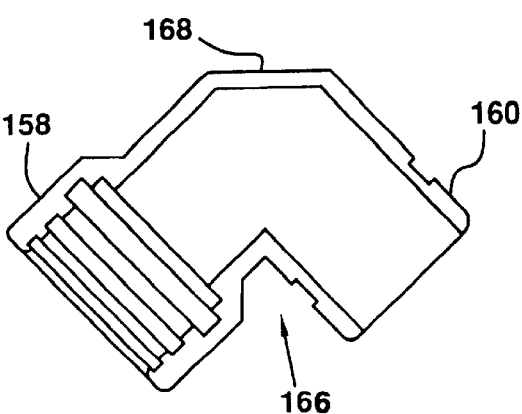
FIG. 13 shows a 90° connector with a partially cylindrical central section.

FIG. 13 shows a 90° connector in which elements are numbered similar to elements in connector 156. A central section 168 has a tapered, partially cylindrical wall which interconnects the end sections 160 and 158. Two connectors 166 may be interconnected to provide a substantially universal connection.

Figure 14:
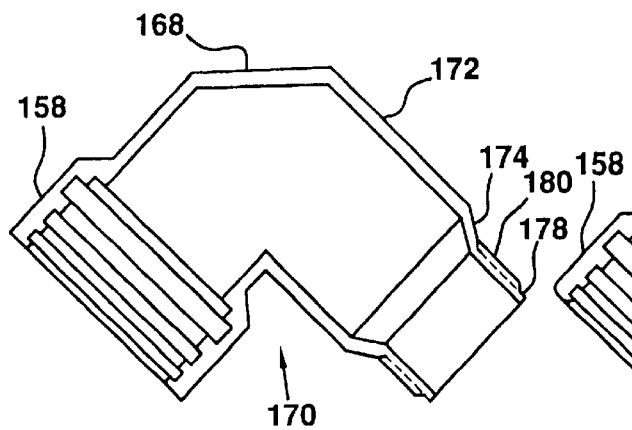
FIG. 14 is a cross-sectional view of a 90° connector having a necked n and threaded second cylindrical end.

FIG. 14 shows a 90° connector with a cylindrical end 158 similar to the end 158 in FIGS. 12 and 13, and a partially cylindrical center section 168 similar to that shown in FIG. 13. The connector 170 shown in FIG. 14 has a cylindrical second end 172 with a necked down portion 174 and a terminal threaded cylindrical portion 178, with male threads 180 for connecting to an internally threaded connector.

Figure 15:
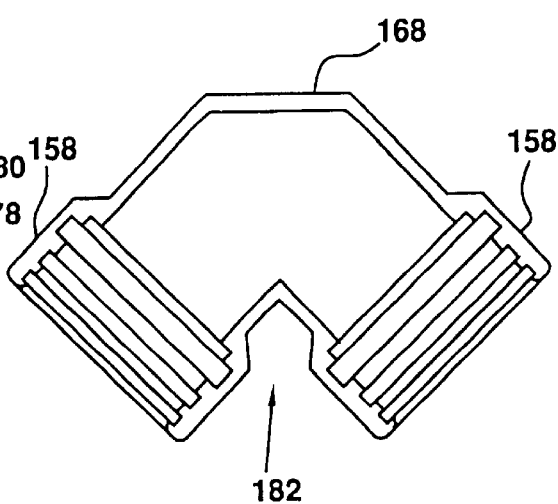
FIG. 15 shows a double-ended 90° connector having similar construction at both ends.

FIG. 15 shows a 90° connector, for example a 2" connector having cylindrical ends 158 which are substantially similar to the cylindrical end 158 shown in FIG. 12.

The connecting elements which fit in the central grooves in three-grooved recesses or in the outer of two grooves in two-groove recesses preferably are balls or rollers inserted as described with reference to FIG. 3. Alternatively, split spring rings may be used. In the latter case the rings are compressed, placed within the connecting element receiving groove in the recess, then released. Inserting the tapered or rounded end of the flex pipe compresses the ring-connecting element into the groove. When the flex pipe is fully inserted, its complementary groove in its exterior cylindrical surface is aligned with the ring-holding groove. The ring then expands so that it partially resides in both grooves, holding the flex pipe assembled in the connector and allowing 360° rotation around its axis.

While the invention has been described with reference to specific embodiments, modifications and variations of the invention may be constructed without departing from the scope of the invention, which is defined in the following claims.

I claim:

1. A flexible pipe coupling system comprising a tubular elbow having a turnback rolled and upset at one end for mounting within a recess within a bolt-on flange, and having at the second end an annular groove around an exterior wall portion, the annular groove being spaced inward from the distal end for connecting to a flexible pipe, further comprising a flexible hose coupling and having a flexible pipe with an enlarged end overlying the end of the elbow which has an exterior annular groove, the enlarged end of the coupling having a cylindrical recess for receiving the end of the elbow, and having an annular groove in the recess for aligning with the annular groove in the elbow exterior wall, a shoulder at the end of the interior recess for receiving the end of the elbow, an annular seal disposed between an interior wall of the recess and the end of the elbow within the recess, and a connector disposed in the annular grooves.

2. The apparatus of claim 1, further comprising a flange placed over the elbow and having a central opening with an annular recess for receiving the turnback, and having holes extending to the flange around the central opening for bolting the flange to a face of a pump outlet flange.

3. The apparatus of claim 2, wherein the recess extends approximately one-fifth to halfway through the flange around the central opening, wherein a base surface of the recess is flat, and wherein a wall of the recess is angled at about 45° to the base surface of the flange and forms a truncated conical surface.

4. The apparatus of claim 2, wherein an annular intersection between the recess and the central opening is radiused and toroidal.

5. The apparatus of claim 4, wherein the central opening has a cylindrical portion adjacent the radius.

6. The apparatus of claim 2, wherein the flange is generally rectangular, and wherein the bolt-receiving holes comprise four equally spaced arcuate-shaped through-hole openings near corners of the rectangular flange.

7. A flexible pipe coupling system comprising a tubular elbow having a turnback rolled and upset at one end for mounting within a recess within a bolt-on flange, and having at the second end an annular groove around an exterior wall portion, the annular groove being spaced inward from the distal end for connecting to a flexible pipe, further comprising a flange place over the elbow and having a central opening with an annular recess for receiving the turnback, and having holes extending to the flange around the central opening for bolting the flange to a face of a pump outlet flange, wherein the recess extends approximately one-fifth to halfway through the flange around the central opening, wherein a base surface of the recess is flat, and wherein a wall of the recess is angled at about 45° to the base surface of the flange and forms a truncated conical surface, wherein an annular intersection between the recess and the central opening is radiused and toroidal, wherein the central opening has a cylindrical portion adjacent the radius, wherein the recess is about 20% to 25% of thickness of the flange.

8. The apparatus of claim 7, wherein an annular intersection between the base of the recess and the side walls of the recess is a sharp 90° angle.

9. A flexible pipe coupling system comprising a tubular elbow having a turnback rolled and upset at one end for mounting within a recess within a bolt-on flange, and having at the second end an annular groove around an exterior wall portion, the annular groove being spaced inward from the distal end for connecting to a flexible pipe, further comprising a flange placed over the elbow and having a central opening with an annular recess for receiving the turnback, and having holes extending to the flange around the central opening for bolting the flange to a face of a pump outlet flange, wherein the flange is generally rectangular, and wherein the bolt-receiving holes comprise four equally spaced arcuate-shaped through-hole openings near corners of the rectangular flange, wherein the connector comprises toroidal elements positioned in the grooves, and further comprising an access opening extending between the groove in the recess of the coupling and an outer wall of the coupling for inserting connectors in the grooves.

10. Flex pipe coupling apparatus, comprising a connector body having angularly related ends and having a central portion between the ends, at least one of the ends having a cylindrical recess, a shoulder at an axial end of the recess near the central portion for cooperating with an end of a flex pipe inserted in the recess, an annular seal receiver in the cylindrical recess near the shoulder for holding a resilient seal for sealing the end of the flex pipe, and an annular groove in the recess for cooperating with an annular groove in the flex pipe to receive and hold connecting elements for connecting the flex pipe to the connector, further comprising a second cylindrical recess in the second end of the pipe, a second shoulder at an axial end of the second recess near the central portion for cooperating with an end of a second flex pipe, a second annular seal receiver in the second cylindrical recess near the second shoulder for holding a second resilient seal for sealing the end of the second flex pipe, and a second annular groove in the second recess for cooperating with an annular groove in an exterior wall of the second flex pipe to receive and hold connecting elements for connecting the second flex pipe to the second cylindrical recess in the connector, wherein the first end of the connector is generally cylindrical, and further comprising a generally rectangular flange integrally formed at the second end of the connector, the flange having arcuate bolt-receiving through-holes near corners of the rectangular flange for mounting the flange.

11. The apparatus of claim 10, further comprising opposite bosses extending from the flange along the cylindrical section, and threaded openings extending radially through the bosses and the cylindrical sections.

12. Flex pipe coupling apparatus, comprising a connector body having angularly related ends and having a central portion between the ends, at least one of the ends having a cylindrical recess, a shoulder at an axial end of the recess near the central portion for cooperating with an end of a flex pipe inserted in the recess, an annular seal receiver in the cylindrical recess near the shoulder for holding a resilient seal for sealing the end of the flex pipe, and an annular groove in the recess for cooperating with an annular groove in the flex pipe to receive and hold connecting elements for connecting the flex pipe to the connector, further comprising a second cylindrical end angularly related to the first cylindrical end, and wherein the second cylindrical end has a groove in its outer wall, wherein the first end has three annular grooves extending into the recess.

13. The apparatus of claim 12, wherein the second end extends at about 135° to the first end.

14. The apparatus of claim 12, wherein the first cylindrical end section and the second cylindrical end section are oriented at 90°, and further comprising a central, partially cylindrical section joining the first and second end sections.

15. The apparatus of claim 14, wherein the second end section has a cylindrical outer wall with an annular groove in the cylindrical outer wall.

16. The apparatus of claim 14, wherein the first and second ends are substantially similar.

17. Flex pipe coupling apparatus, comprising a connector body having angularly related ends and having a central portion between the ends, at least one of the ends having a cylindrical recess, a shoulder at an axial end of the recess near the central portion for cooperating with an end of a flex pipe inserted in the recess, an annular seal receiver in the cylindrical recess near the shoulder for holding a resilient seal for sealing the end of the flex pipe, and an annular groove in the recess for cooperating with an annular groove in the flex pipe to receive and hold connecting elements for connecting the flex pipe to the connector, further comprising a second cylindrical end angularly related to the first cylindrical end, and wherein the second cylindrical end has a groove in its outer wall, wherein the first cylindrical end section and the second cylindrical end section are oriented at 90°, and further comprising a central, partially cylindrical section joining the first and second end sections, wherein the second end section has a necked down section and a terminal portion with external threads.

18. A flexible hose coupling comprising a flexible inner pipe having an end with an exterior annular groove, a flexible outer pipe with an enlarged end overlying the end of the inner pipe, the enlarged end having a cylindrical recess for receiving the end of the inner pipe, an annular groove in the recess for aligning with the annular groove in the inner pipe, a shoulder at the end of the recess for receiving the end of the inner pipe, an annular seal disposed between an interior wall of the recess and the end of the inner pipe within the recess, and a connector disposed in the annular groove.

19. The coupling of claim 18, wherein the connector comprises toroidal elements positioned in the groove, and further comprising an access opening extending between the groove in the recess of the coupling and an outer wall of the coupling for inserting connectors in the grooves.

* * * * *